United States Patent Office 2,857,427
Patented Oct. 21, 1958

2,857,427

METHOD FOR PREPARING STABLE SUCCINALDEHYDE PRODUCTS

Werner Richard Boehme, Somerville, and Martin Tobkes, Bound Brook, N. J., assignors to Ethicon, Inc., a corporation of New Jersey No Drawing. Application November 13, 1957
Serial No. 696,048

3 Claims. (Cl. 260—513)

This invention relates to a method for preparing bisulfite addition products of succinaldehyde.

Succinaldehyde is a well-known chemical reagent. It is widely used as an intermediate in the synthesis of useful organic products. For example, it is used in the synthesis of tropane alkaloids such as tropanones and quinoxalines, and as a tanning agent in cross-linking of polymers, e. g. proteins.

Despite its desirable qualities as an intermediate, succinaldehyde is limited in practical applicability because of its instability. It is prone to spontaneous polymerization, and is difficult to isolate conveniently from aqueous solutions, except in the form of difficultly-reversible complexes, such as dinitrophenylhydrazones and oximes. Moreover, some of the presently-known methods for preparing succinaldehyde (electrolytic oxidation of butane-diol and ring fission of pyrrole) are industrially prohibitive because of the high cost of manufacture and/or unobtainability of starting materials.

We have now discovered a method for preparing readily available forms of succinaldehyde. This method, which results in the formation of succinaldehyde bisulfite adducts, now makes succinaldehyde itself a readily-available product. The succinaldehyde adducts are stable, water-soluble solids which can be readily converted to the free aldehyde in the presence of an acid or alkali.

In accordance with the method of this invention, a 2,5-dialkoxy-tetrahydrofuran, or the corresponding diacyloxy tetrahydrofuran, is reacted directly with an alkali metal bisulfite, e. g. sodium or potassium bisulfite. The reaction is advantageously carried out at an elevated temperature, e. g. about 100° C., preferably 80–100° C., for a period of about 6 to 12 hours. The resulting bis-alkali metal bisulfite dihydrate adduct of succinaldehyde separates spontaneously in the form of colorless needles upon cooling in the reaction mixture. If desired, the product may be recrystallized from an aqueous alkanol such as aqueous methanol or ethanol.

The 2,5-dialkoxy-tetrahydrofurans and 2,5-diacyloxy-tetrahydrofurans used as starting materials are known and methods for their preparation are available in the literature. The nature of the dialkoxy and diacyloxy substituents in the 2,5-positions of the tetrahydrofuran is not critical since these groups are removed by hydrolysis during the course of the reaction. As a matter of convenience, one may employ, interchangeably, dimethoxy, diethoxy, dibutoxy, dipropoxy, diisopropoxy, acetoxy, propionoxy, chloracetoxy or similar groups on the tetrahydrofuran nucleus.

In actual practice the succinaldehyde bisulfite adduct is employed in the form of an aqeous solution which, on adjustment of pH to the acid side, results in the release of the free aldehyde which is immediately available for reaction.

The following example is intended to illustrate, but not to limit, the invention.

*Example*

A solution of 8 parts by weight of 2,5-diethoxy-tetrahydrofuran in 170 parts by volume of saturated sodium bisulfite solution is heated on a steam bath for 11 hours and cooled. The bis-sodium bisulfite dihydrate adduct of succinaldehyde separates on cooling as colorless needles, recrystallizable from 60% aqueous ethanol. It has no melting point and decomposes at about 300° C.

|  | C | H | $H_2O$ |
|---|---|---|---|
| Calc'd for $C_4H_{12}O_{10}Na_2$ | 14.55 | 3.66 | 10.91 |
| Found | 14.70 | 3.85 | 10.78 |

In the same manner 2,5-diethoxy-tetrahydrofuran may be reacted with a saturated potassium bisulfite solution to give the bis-potassium bisulfite dihydrate adduct of succinaldehyde.

A solution of 132 parts by weight of succinaldehyde bis-sodium bisulfite dihydrate, 93.4 parts by weight of acetone dicarboxylic acid and 43.2 parts by weight of methylamine hydrochloride are dissolved in 3000 parts by volume of water. The mixture is allowed to stand for three days at room temperature, the resulting solution is saturated with potassium carbonate and extracted with ether. The extracts are dried over anhydrous potassium carbonate and distilled under reduced pressure to give tropanone which distils at 109–112° C./20 mm., and solidifies on cooling to a colorless solid melting at 43–45° C.

What is claimed is:

1. A method for preparing alkali metal bisulfite adducts of succinaldehyde which comprises the step of reacting a member of the group consisting of 2,5-dialkoxy-tetrahydrofuran and 2,5-diacyloxy-tetrahydrofuran with an alkali metal bisulfite.

2. A method as set forth in claim 1 wherein the alkali metal bisulfite is sodium bisulfite.

3. A method as set forth in claim 1 wherein the alkali metal bisulfite is potassium bisulfite.

References Cited in the file of this patent

UNITED STATES PATENTS

| 2,515,304 | Jones | July 18, 1950 |
| 2,671,800 | Copenhaver | Mar. 9, 1954 |
| 2,750,418 | Clauson-Kaas | June 12, 1956 |